United States Patent [19]

Tsuchiya et al.

[11] Patent Number: 5,689,495

[45] Date of Patent: *Nov. 18, 1997

[54] HIGH DENSITY OPTICAL DISC AND OPTICAL DISC PLAYER

[75] Inventors: Yoichi Tsuchiya, Hashima; Hitoshi Terasaki, Gifu; Shuichi Ichiura, Hashima; Toshio Ito, Hashima; Yasuyuki Kano, Hashima; Yoshimoto Yamaguchi, Gifu; Seizo Kato, Ogaki; Osamu Ota, Ibi-gun, all of Japan

[73] Assignee: Sanyo Electric Co., Ltd., Moriguchi, Japan

[*] Notice: The term of this patent shall not extend beyond the expiration date of Pat. No. 5,477,527.

[21] Appl. No.: 709,671

[22] Filed: Sep. 9, 1996

Related U.S. Application Data

[63] Continuation of Ser. No. 602,687, Feb. 16, 1996, abandoned, which is a continuation of Ser. No. 285,553, Aug. 3, 1994, abandoned, which is a continuation-in-part of Ser. No. 227,641, Apr. 14, 1994, Pat. No. 5,477,527.

[30] Foreign Application Priority Data

| Feb. 2, 1994 | [JP] | Japan | ........................... 6-11087 |
| Mar. 5, 1994 | [JP] | Japan | ........................... 6-60019 |

[51] Int. Cl.[6] .................................................. G11B 7/24
[52] U.S. Cl. ................................. 369/275.4; 369/58
[58] Field of Search ........................... 369/275.4, 275.3, 369/275.2, 275.1, 13, 277, 284, 58; 428/64, 64.1, 64.2, 64.3, 64.4; 430/321

[56] References Cited

U.S. PATENT DOCUMENTS

| 5,040,165 | 8/1991 | Taii et al. ........................... 369/275.4 |
| 5,214,629 | 5/1993 | Watanabe et al. .................. 369/275.3 |
| 5,216,646 | 6/1993 | Imanaka et al. .................... 369/275.3 |
| 5,353,265 | 10/1994 | Maeda et al. ...................... 369/13 |
| 5,383,176 | 1/1995 | Inui et al. ......................... 369/275.4 |
| 5,459,712 | 10/1995 | Sugaya et al. .................... 369/275.4 |
| 5,517,486 | 5/1996 | Haneda ............................... 369/275.4 |

OTHER PUBLICATIONS

Optical Memory Symposium '92, Yokohama, Japan, pp. 69–70, Jul. 1991.

Nikkei Electronics 1991.5.27, No. 528, pp. 124–130, May, 1991.

*Primary Examiner*—Tan Dinh
*Attorney, Agent, or Firm*—Armstrong, Westerman, Hattori, McLeland & Naughton

[57] ABSTRACT

An optical disc having a track pitch of 0.85 μm, a shortest pit length of 0.49 μm, a pit depth of 100 nm, and a pit width of 0.35 μm is rotated at a linear velocity of 2.4–2.8 m/s such that the same is optically reproduced by a laser beam having a wavelength of 635 nm which is converged to a spot size of 0.9 μm by an objective lens having a numerical aperture of 0.6. Accordingly, data is read from the optical disc at a transfer rate of 5.6 Mbps.

15 Claims, 10 Drawing Sheets

F I G. 2
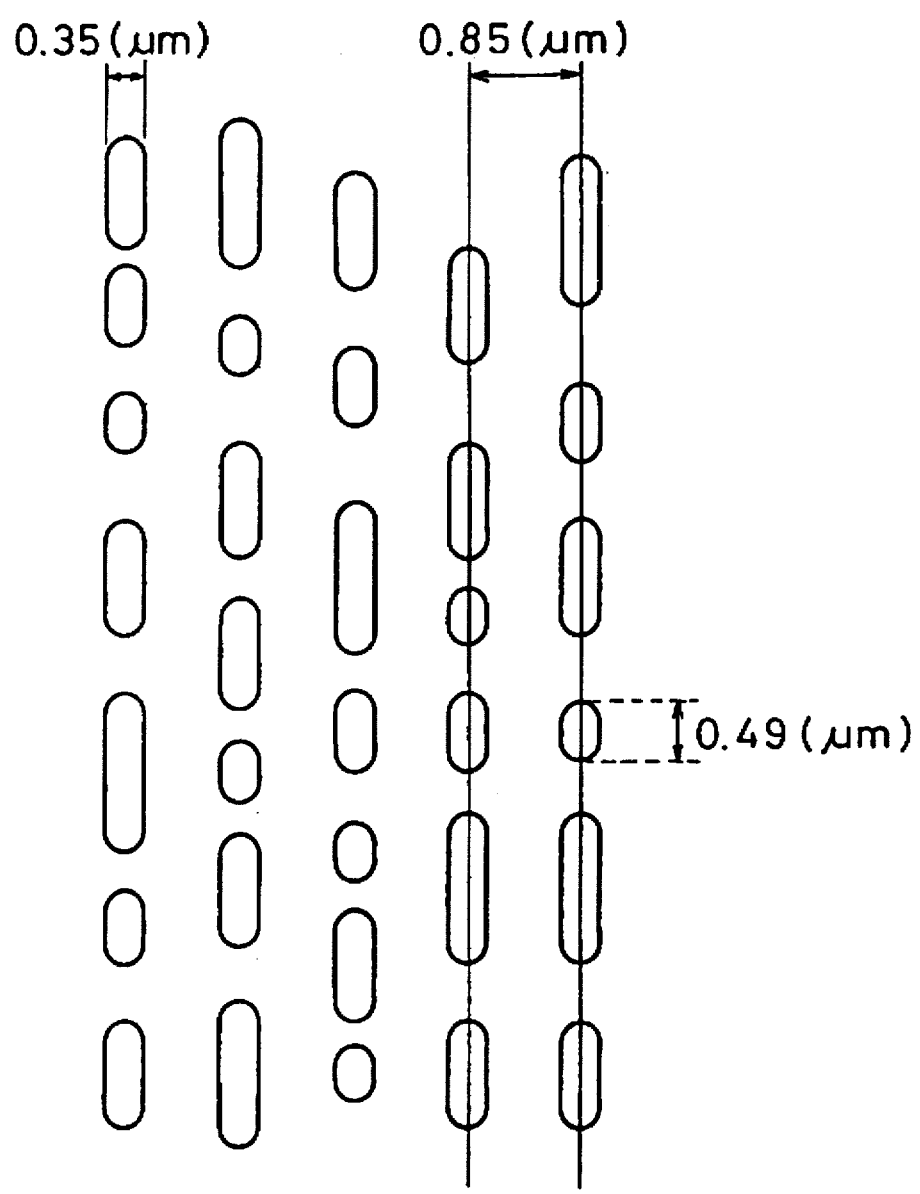

F I G. 7
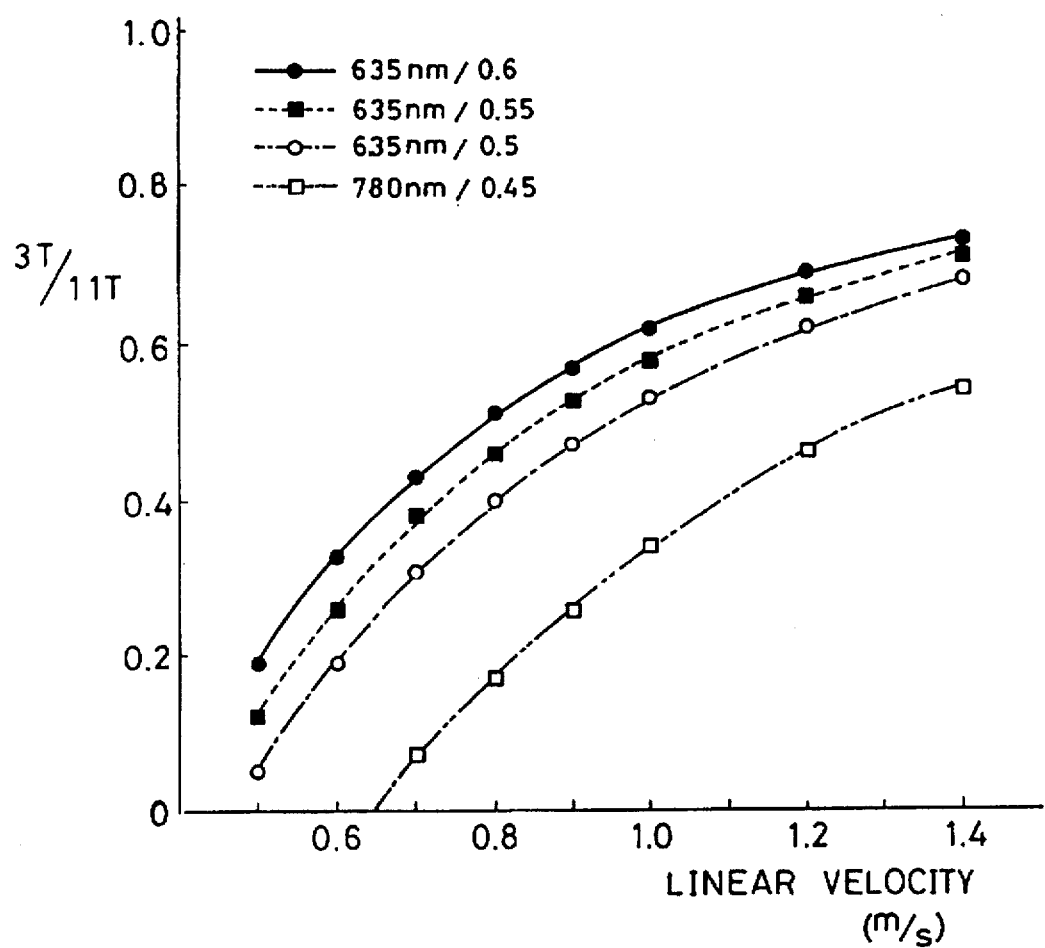

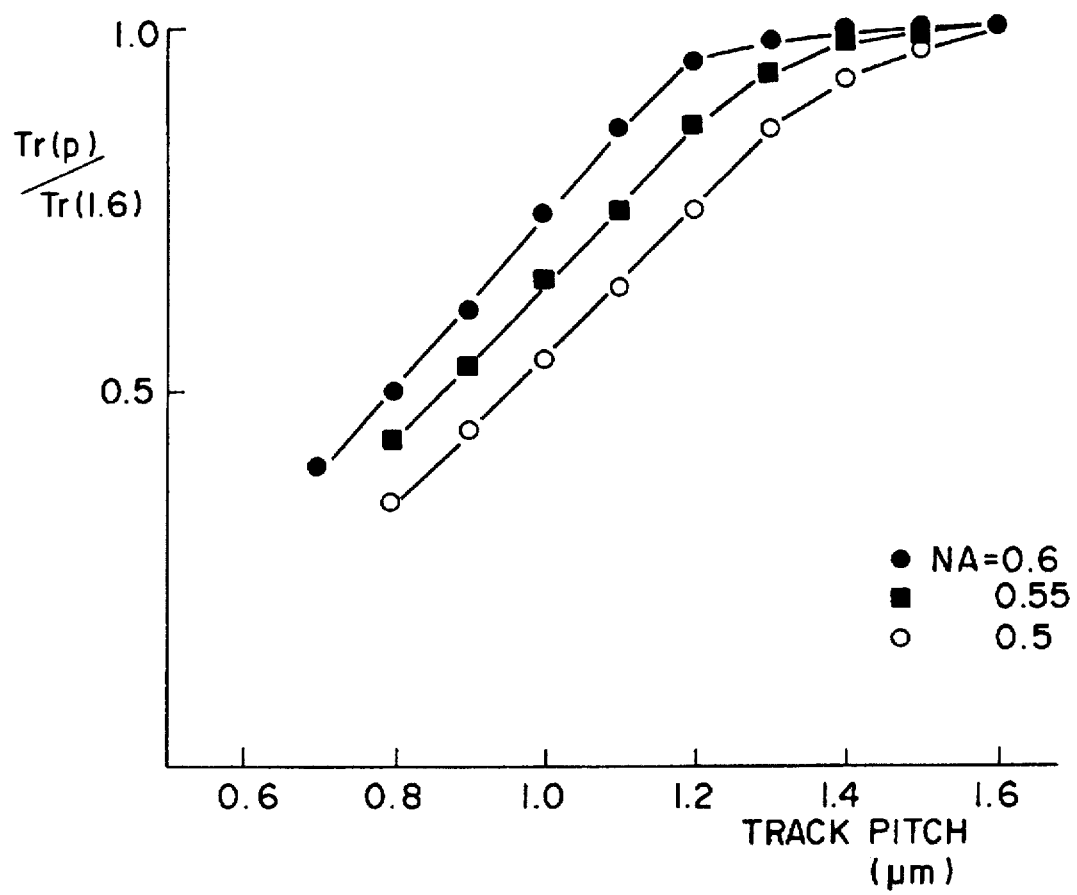
F I G. 8

HIGH DENSITY OPTICAL DISC AND OPTICAL DISC PLAYER

This application is a continuation of application Ser. No. 08/602,687, filed Feb. 16, 1996, now abandoned, which is a continuation of application Ser. No. 08/285,553, filed Aug. 3, 1994, now abandoned, which is a continuation-in-part of application Ser. No. 08/227,641, filed Apr. 14, 1994, now patented as U.S. Pat. No. 5,477,527.

BACKGROUND OF THE INVENTION

1. Field of the Invention

This application is a continuation-in-part application of application Ser. No. 08/227,641, filed Apr. 14, 1994, and relates to an optical disc and an optical disc player. More specifically, the present invention relates to an optical disc such as compact disc (CD), laser disc (LD), photo-magnetic disc and etc., and a reproducing apparatus thereof.

2. Description of the Prior Art

In a prior art 12 cm CD with a conventional standard format, as shown in FIG. 1, a shortest pit length (a pit length of 3T) of an EFM demodulation is approximately 0.97 μm (at a time that a reproducing time is 60 minutes), a pit width is approximately 0.7 μm, and a track pitch is approximately 1.6 μm. In a player for reproducing such the conventional standard format CD, the CD is rotated at a linear velocity of 1.2–1.4 m/s, and by utilizing an objective lens having a numerical aperture of 0.45, a laser having a wavelength of 780 nm and a spot size of 1.4 μm is irradiated onto a track of the CD, whereby audio data is reproduced at a transfer rate of 1.4 Mbps.

In the recent years, in accordance with the development of a short wavelength laser, it becomes unnecessary to make a track pitch equal to the track pitch of the prior art. On the other hand, in order to record a video signal, it is required to increase a recording density on the disc. Especially, in a case of a digital video disc and etc. utilizing MPEG2 that will become a standard in the near future, it is desirable to produce a high-density recording having four times the density of the conventional standard format.

According to such a requirement, in an article entitled as "Development of Quadruple Density Compact Disc", p.p. 174–177 of a collection of papers in JAS conference '90, a CD in which a recording density has quadruple the recording density of the conventional standard format is proposed, in that by utilizing an argon ion laser having a wavelength of 457.9 nm, and an objective lens having a numerical aperture of 0.93, a track pitch is made 0.8 μm and a recording linear velocity is made 0.7 m/s. The quadruple density CD is reproduced with a beam spot size of 0.75 μm by utilizing an air-cooled compact argon laser having a wavelength of 488 nm and an objective lens having a numerical aperture of 0.6.

According to the prior art, it is possible to make the recording density of a CD large. However, in the prior art, since the air-cooled compact argon laser is utilized for reproducing the CD, it is impossible to make a disc player compact. In other words, the prior art cannot be utilized for a miniaturized disc player.

Furthermore, in the prior art, since the argon laser having a wavelength of 488 nm is used, it is impossible to reproduce a CD on which data is recorded according to a conventional standard format. More specifically, in general, a pit is recorded with a pit depth of λ/4n (λ=wavelength, and n=refractive index≒1.5). Therefore, in a case of the conventional standard format, a pit is recorded with a pit depth (approximately 112 nm) applicable to a wavelength of 670 nm. On the other hand, in a case of a wavelength of 488 nm, a pit depth of approximately 81 nm is suitable. Therefore, if the CD of the conventional standard format is reproduced by the argon laser having a wavelength of 488 nm, a phase difference between an irradiated light and a reflected light at a surface of the disc does not become 180 degrees, and therefore, a level of a reproduced signal becomes small. Resultingly, the CD of the conventional standard format can not be reproduced by the argon laser having a wavelength of 488 nm. In other words, in the prior art, there is no compatibility for a high-density disc and a low-density (conventional standard format) disc.

SUMMARY OF THE INVENTION

Therefore, a principal object of the present invention is to provide an optical disc capable of being recorded by a novel recording format with a high-density.

Another object of the present invention is to provide a disc player capable of reproducing such a high-density optical disc.

Another object of the present invention is to provide a disc player capable of reproducing a high-density optical disc as well as a conventional standard format optical disc.

An optical disc according to the present invention has a shortest pit length of approximately 0.42–0.49 μm, a track pitch of approximately 0.70–0.85 μm, and a pit width of approximately 0.2–0.35 μm.

An optical disc player according to the present invention utilizes a laser having a spot size of approximately 0.85–0.95 μm and a wavelength of approximately 590–770 nm.

In a preferred exemplary embodiment, the optical disc is rotated at a linear velocity of 2.4–2.8 m/s, and therefore, data is reproduced at a transfer rate of 5.6 Mbps.

The optical disc player preferably includes an objective lens having a numerical aperture of 0.6, whereby a spot size of a laser beam having a wavelength of 685 nm is made to be approximately 0.90 μm. In such a disc player, a conventional standard format optical disc having a track pitch of 1.6 μm, a pit width of 0.7 μm, and a shortest pit length of 0.97 μm can also be reproduced.

Furthermore, the optical disc player according to the present invention utilizes an objective lens having a numerical aperture of 0.5–0.6, and a laser having a wavelength of 590–650 nm, and is capable of reproducing an optical disc having a track pitch of 0.8–1.00 μm (including a tolerance), a shortest pit length of 0.42–0.49 μm, and a pit width of 0.2–0.35 μm.

In accordance with the present invention, a quadruple density optical disc in which a shortest pit length and a track pitch are made to be half a shortest pit length and a track pitch of the conventional standard format, respectively, is obtainable. If such an optical disc is reproduced under conditions that an optical pickup in which a numerical aperture of an objective lens is large is utilized, and that a laser beam having a spot size being a half a spot size by which the conventional standard format optical disc is reproduced and a wavelength of 635 nm, for example, is irradiated, and that a linear velocity is set to double a linear velocity at which the conventional standard format optical disc is reproduced, a signal can be reproduced at a rate being quadruple a rate of the conventional standard format. Therefore, according to the present invention, it becomes possible to reproduce moving amaze data which is compressed in accordance with the MPEG2 standard.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a pit size and a track pitch in a quadruple density CD according to a preferred exemplary embodiment of the present invention;

FIG. 7 is a graph showing a relationship between a linear velocity and an amplitude ratio of the reproduced signals of a pit length of 3T and a pit length of 11T with parameters of a wavelength of a laser beam and a numerical aperture of an objective lens in the embodiment;

FIG. 8 is a graph showing a relationship between a track pitch, and an amplitude of a tracking signal in the preferred exemplary embodiment and an amplitude of a tracking signal of a case of a track pitch of 1.6 μm;

DETAILED DESCRIPTION OF THE PREFERRED EMBODIMENTS

A CD 26 of a preferred exemplary embodiment according to the present invention is shown in FIG. 2 and has a disc size (diameter) of 12 cm. The CD 26 is recorded with a shortest pit length in an EFM modulation of 0.49 μm, a pit width of 0.35 μm, and a track pitch of 0.85 μm. However, if the shortest pit length, pit width and track pitch respectively have clearances with a tolerance of about −15%, no hindrance occurs in practical use.

Figure 1:
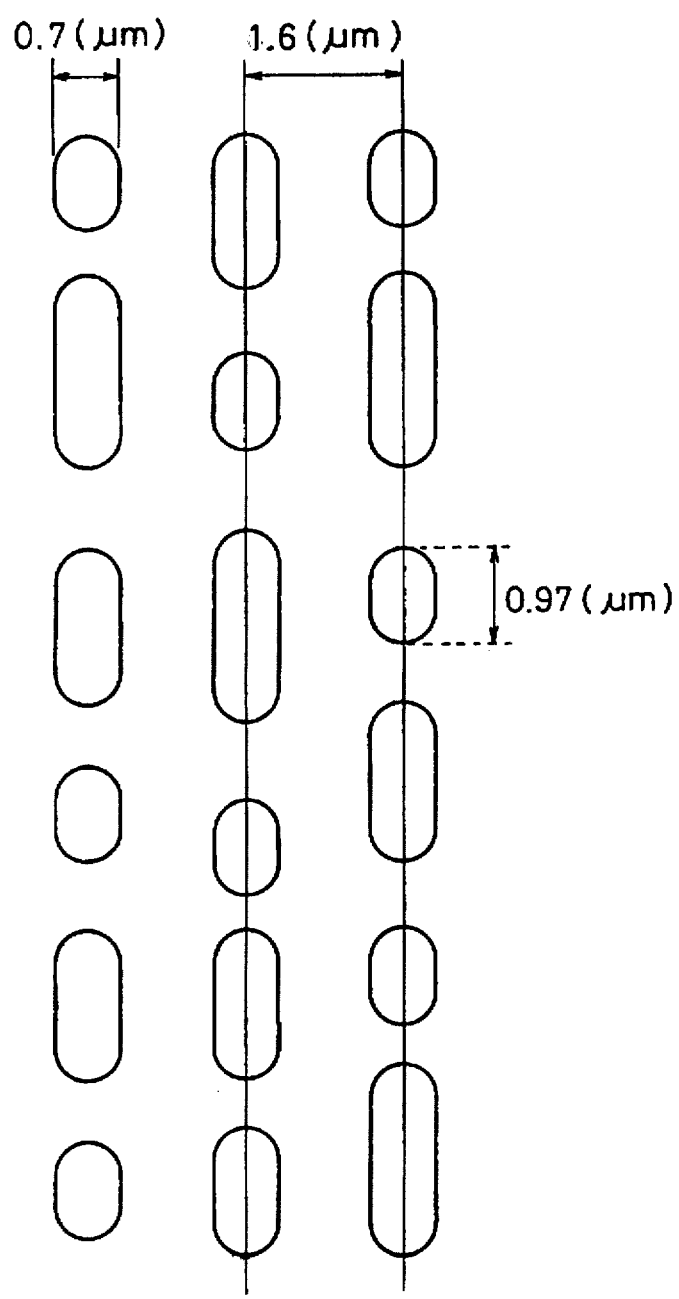
FIG. 1 is an illustrative view showing a pit size and a track pitch in a conventional standard format CD.

In the CD 26 according to the preferred exemplary embodiment shown, data is recorded by setting a recording linear velocity at 0.7 m/s, with a krypton laser having a wavelength of 407 nm and a transfer rate of 1.4 Mbps. A pit depth of 100–120 nm is desirable as similar to that of the conventional standard format CD (FIG. 1). In addition, in the CD according to the preferred exemplary embodiment, since the data is recorded with a recording density being quadruple the recording density of the conventional standard format, the CD is suitable for an optical disc in which moving image data compressed according to the MPEG2 standard is recorded. In addition, in a case where a disc size (diameter) is made half (approximately 6 cm), it is possible to secure a recording capacity similar to that of the 12 cm CD with the conventional standard format, and in such a case, there is an advantage that a disc player can be miniaturized.

Next, with referring to FIG. 3 and FIG. 4, a disc player for reproducing the CD of the preferred exemplary embodiment will be described.

Figure 3:
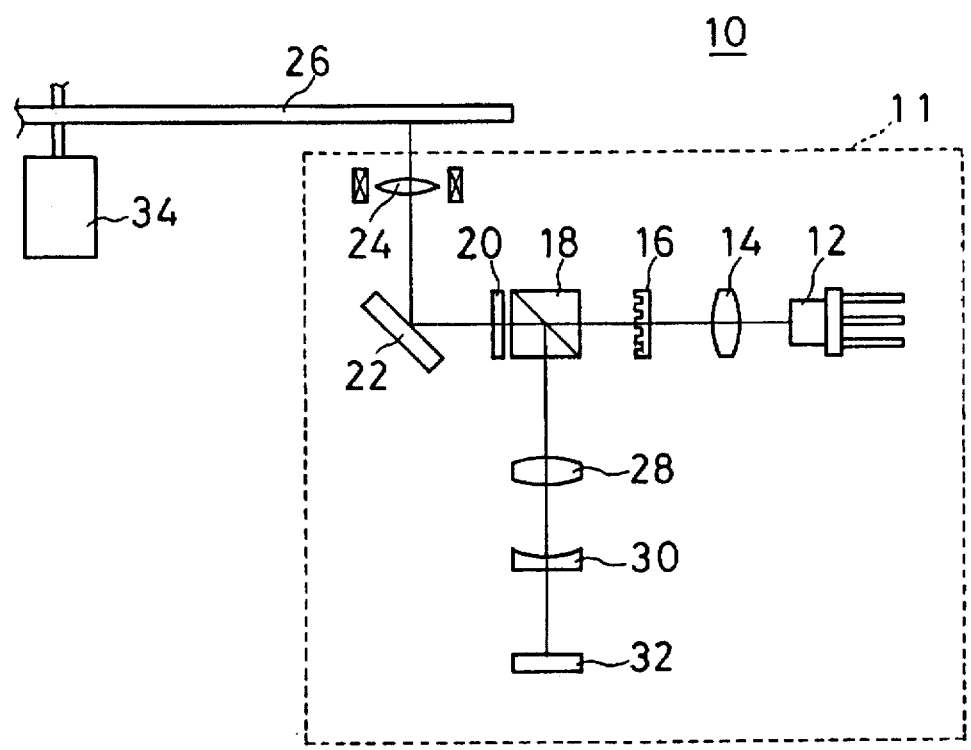
FIG. 3 is an illustrative view showing one example of an optical system of a disc player.

In the disc player 10 shown in FIG. 3, a laser beam is outputted from a semiconductor laser 12 which is included in an optical pick-up 11 and has a wavelength of 635 nm (tolerance±15 nm), and the laser beam is irradiated into a diffraction grating plate 16 as a coherent light through a collimator lens 14. In addition, one example of the semiconductor laser which has a wavelength of 635 nm and can be utilized as a light source of the disc player 10 is disclosed in U.S. Pat. No. 5,016,252 issued on May 18, 1991 or U.S. Pat. No. 5,146,466 issued on Sep. 8, 1992, and in this embodiment shown, the semiconductor laser according to the U.S. Pat. No. 5,016,252 or 5,146,466 is utilized. The laser beam is converted into three beams by the diffraction grating plate 16, and thereafter, the laser beam is irradiated into an objective lens 24 having a numerical aperture of 0.6 (tolerance±0.05) through a beam splitter 18, a λ/4 plate 20 and a reflection mirror 22. The laser beam outputted from the objective lens 24 is irradiated onto a recording track of the CD 28 (CD shown in FIG. 2) with a spot size (diameter) of 0.9 μm. A reflection light from the CD 26 is returned to the beam splitter 18 through the objective lens 24, the reflection mirror 22 and the λ/4 plate 20, and only the reflection light is divided by the beam splitter 18. A divided reflection light is irradiated into a photo-receiving element 32 through a condenser lens 28, and a cylindrical lens 30, so that a reproduced signal is obtained through the photo-electric conversion at the photo-receiving element 32, and the reproduced signal is outputted from the optical pick-up 11.

In the preferred exemplary embodiment shown, a disc motor 24 for rotating the CD 26 is controlled such that a linear velocity of the CD 26 becomes 2.4–2.8 m/s. Resultingly, in the embodiment shown, the data can be reproduced for one hour at a transfer rate of 5.6 Mbps, being quadruple the transfer rate of the conventional standard format. Therefore, the moving image data compressed according to the MPEG2 standard becomes possible to be reproduced for one hour.

Figure 4:
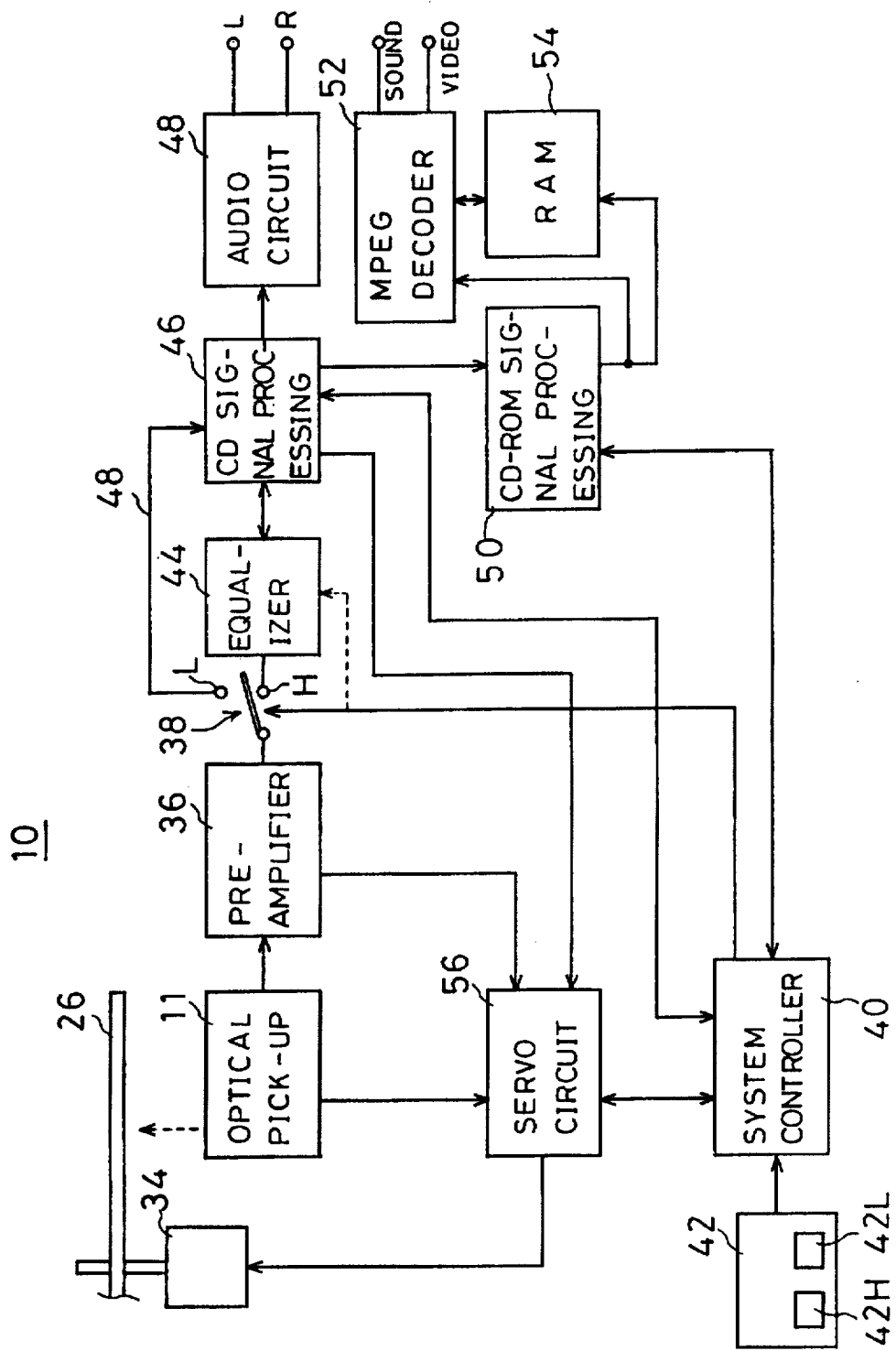
FIG. 4 is a block diagram showing a portion of circuit configuration of the disc player.

The reproduced signal outputted from the optical pick-up 11 is, as shown in FIG. 4, applied to a switch 38 through a preamplifier 36. The switch 38 is switched into a high-density side contact H or a low-density side contact L by a system controller 40 composed of a microcomputer, for example. More specifically, a signal input circuit 42 such as a remote controller is coupled to the system controller 40, and the signal input circuit 42 is provided with a high-density disc play button 42H and a low-density disc play button 42L, and the button 42H is depressed when the above described quadruple density CD 26 (FIG. 2) is to be reproduced, and the button 42L is depressed when the conventional standard format CD (FIG. 1) is to be reproduced. Therefore, to the system controller 40 from the signal input circuit 42, a signal representing whether the high-density disc or the low-density disc is to be reproduced is inputted. When the button 42H is depressed, the system controller 40 connects the switch 38 to the contact H, and the switch 38 is connected to the contact L when the button 42L is depressed. Thus, in accordance with the instruction by an operator through the button 42H or 42L, that is, the instruction from the system controller 40, the switch 38 is operated.

When the high-density CD 26 is reproduced, the switch 38 is connected to the contact H, and therefore, the reproduced signal from the preamplifier 36 is inputted to a CD signal processing circuit 48 through an equalizer 44. If the low-density CD is reproduced, the reproduced signal is directly inputted to the CD signal processing circuit 46 through a path 48. In addition, the switch 38 may be provided in the equalizer 44, whereby a frequency characteristic of the equalizer 44 can be changed-over in accordance with the high-density CD or the low-density CD.

The CD signal processing circuit 46 reproduces the data through an EFM demodulation of the reproduce signal. Audio data included in the reproduced data is converted into an audio signal by an audio circuit 48. The reproduced data is also inputted to a CD-ROM signal processing circuit 50. In the CD-ROM signal processing circuit 50, only necessary data is derived from the reproduced signal having a CD-ROM format under the control by the system controller 40. The derived data is applied to a MPEG decoder 52, for example, which restores the data compressed according to the MPEG2 standard. The MPEG decoder 52 utilizes a RAM 54 as a decoder buffer, and an original signal is restored on the basis of the reproduced data. Accordingly, a video signal and an audio signal according to the data reproduced from the CD 26 are outputted from the MPEG decoder 52.

On the other hand, a tracking signal from the preamplifier 36 and a reproduced clock which is outputted from the CD signal processing circuit 46 are inputted to a servo circuit 56. The servo circuit 56 outputs a tracking servo signal on the basis of the tracking signal, and accordingly, a tracking mechanism (not shown) for the CD 26 is controlled. In addition, on the basis of the reproduced block, the servo circuit 56 outputs a rotation servo signal, and accordingly, the rotation of the disc motor 34 is controlled.

Figure 5:
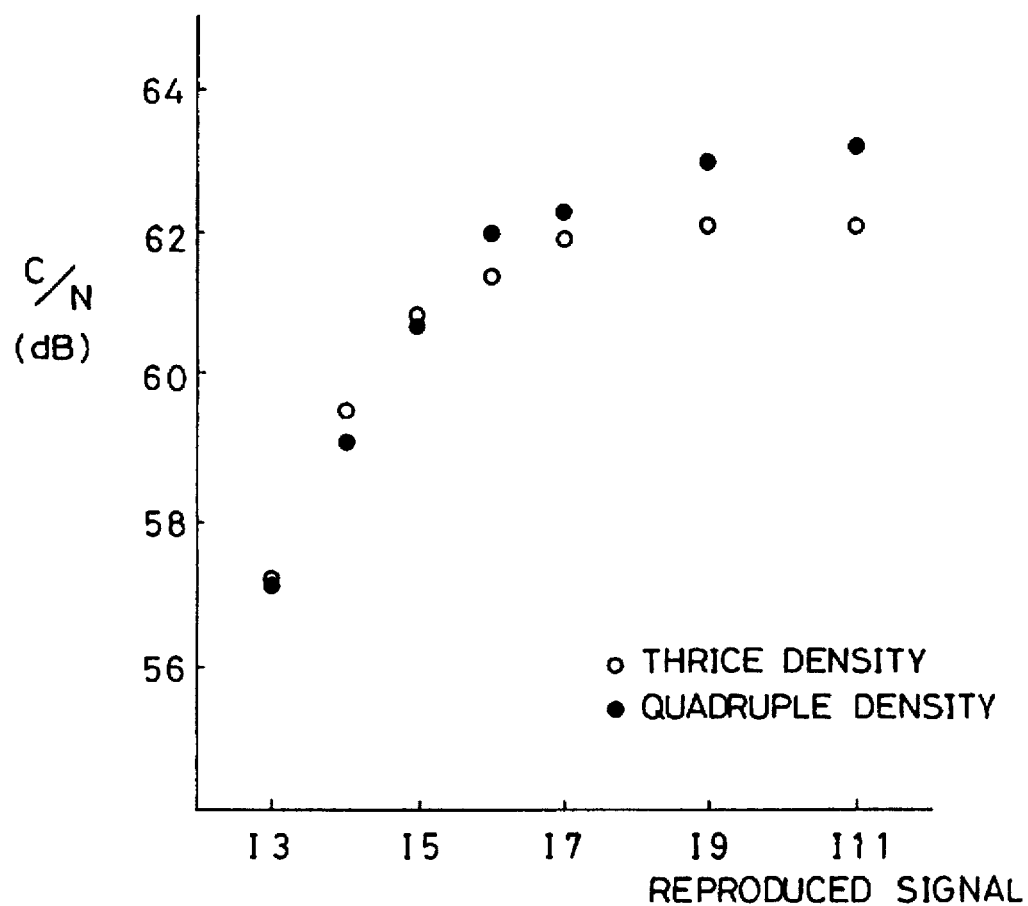
FIG. 5 is a graph showing a C/N characteristic at a time that the quadruple density CD according to the preferred exemplary embodiment is reproduced.

In FIG. 5, a C/N ratio of a reproduced output with respect to respective pit lengths in a case where the quadruple density CD 26 according to the above described embodiment is reproduced by the disc player 10 shown in FIG. 3 and FIG. 4 is shown by black circles. As seen from FIG. 5, as the C/N ratio with respect to a shortest pit frequency, 57.2 dB is secured, and the C/N ratio of a longest pit frequency with respect to the C/N ratio of the shortest pit frequency is set at a degree of 6 dB (±3 dB).

In addition, white circles in FIG. 5 indicate a C/N ratio in a case where a treble density CD having a recording linear velocity of 0.8 m/s and a track pitch of 1.0 μm is reproduced with a reproducing linear velocity of 3.2 m/s by utilizing a pick-up of a laser having a wavelength of 670 nm and an objective lens having a numerical aperture of 0.55. In such a case, as the C/N with respect to a shortest pit frequency, 57.3 dB is secured.

Thus, in the above described preferred exemplary embodiment, when the CD of 12 cm is reproduced at a double speed (linear velocity), the data can be reproduced for a reproducing time equal to a reproducing time that the conventional standard format CD is reproduced at a conventional standard linear velocity, with a frequency being four times a frequency that with which the conventional standard format CD is reproduced at the conventional standard linear velocity. Therefore, according to the preferred exemplary embodiment shown, the moving image data compressed according to the MPEG2 standard can be reproduced for approximately one hour.

In addition, in the above described embodiment, the laser beam is converged by utilizing the objective lens having a numerical aperture of 0.6; however, as a convergence method, another means such as a principle of super-resolution that is disclosed in H. Osterberg and J. E. Wilkins; "The Resolving Power of a Coated Objective."; J. Opt. Soc. Am., 39 (1949) 553–557. or J. E. Wilkins: "The Resolving Power of a Coated Objective II," J. Opt. Soc. Am., 40 (1950) 222–224. may be utilized. Furthermore, the wavelength of the laser beam is desirably 635 nm; however, it is, of course, possible to obtain a small beam spot by utilizing another short wavelength laser and a suitable convergence means. Furthermore, the wavelength of 635 nm is a wavelength by which the data of the conventional standard format can be also reproduced with no hindrance, as described later.

The inventors have investigated degrees of reduction in of an amplitude of the reproduced signal by variously changing the pit length and the reproducing linear velocity, and on the basis of results thereof, the inventors evaluate that a shortest pit length of the EFM modulation can be shortened to what degree, or that the reproducing linear velocity can be slowed to what degree.

Furthermore, the inventors have investigated degrees of reduction of an amplitude of a 3-beam tracking signal by variously changing a track pitch, and on the basis of results thereof, the inventors evaluate that the track pitch can be made narrower to some degree without causing hindrance for the tracking servo.

Furthermore, the inventors have evaluated a range of a spot size by which the quadruple density CD according to the above described embodiment can be well reproduced by changing the spot size of the laser beam irradiated onto the CD.

Furthermore, the inventors have evaluated a range of a wavelength at which not only the CD according to the above described embodiment but also the CD of the conventional standard format can be well reproduced by changing the wavelength of the laser beam.

Figure 6:
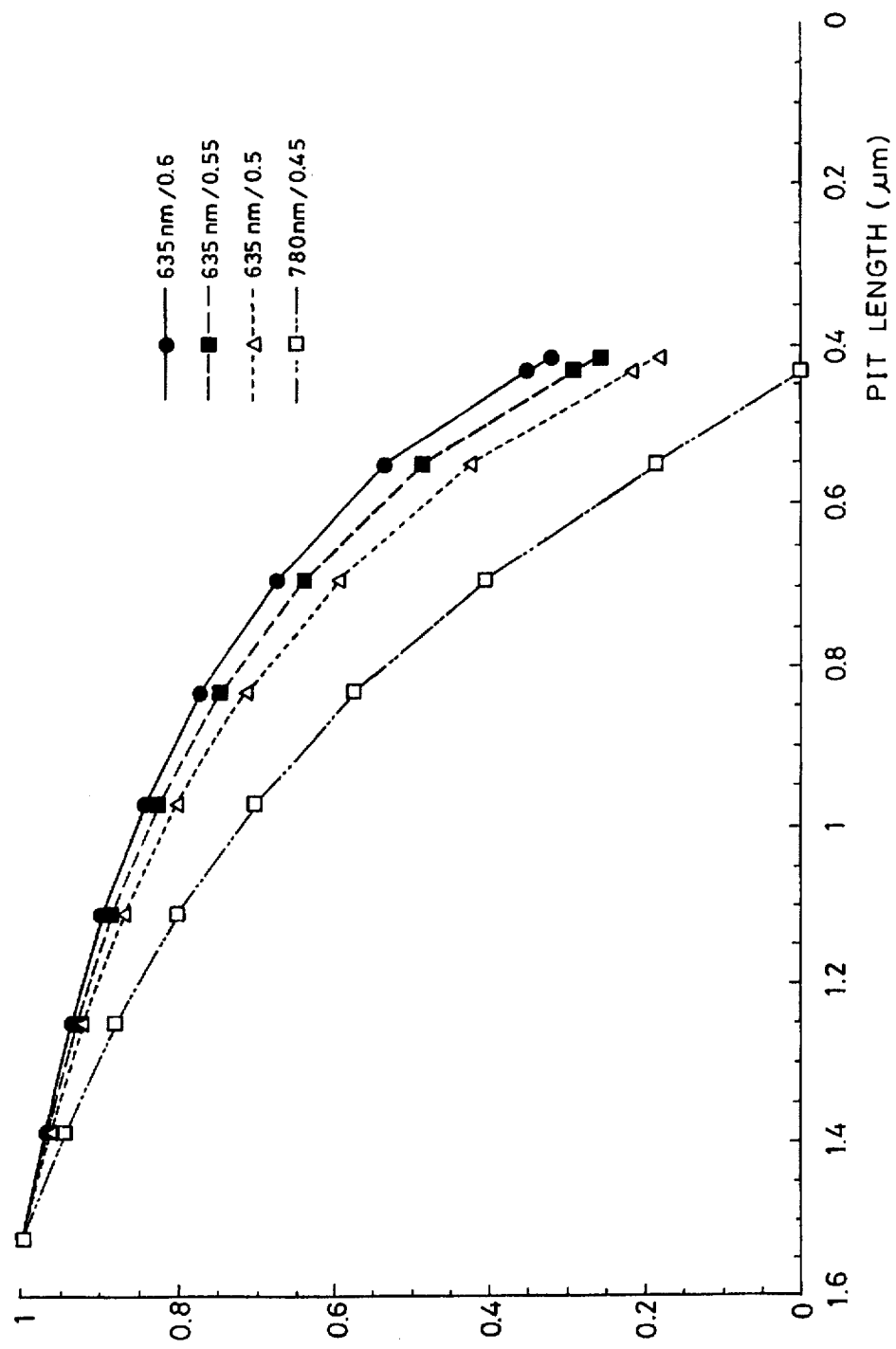
FIG. 6 is a graph showing a relationship between an amplitude of a reproduced signal and a pit length with parameters of a wavelength of a laser beam and a numerical aperture of an objective lens in the preferred exemplary embodiment.

In FIG. 6, an ordinate indicates an amplitude ratio with respect to an amplitude of 11T of the EFM modulation, and an abscissa indicates a pit length. At this time, a wavelength of the laser beam is made be approximately 635 nm, and the numerical apertures of the objective lens are made be 0.6, 0.55 and 0.5, and the reproducing linear velocity is made be 0.6 m/s. In addition, only for reference, an amplitude ratio of a case where the wavelength of the laser beam is 780 nm and the numerical aperture of the objective lens is 0.45 is also shown.

As seen in FIG. 6, an amplitude of the reproduced signal becomes smaller as the pit length is made shorter; however a reduced amplitude can be compensated by the equalizer 44 shown in FIG. 4 and etc. On the other hand, in a case where the signal is emphasized by the above described equalizer 44 (FIG. 4), a noise component is also emphasized, and therefore, the C/N ratio is not changed before and after the equalization. In a case where a pit having a shorter length is reproduced, since the amplitude becomes smaller, that is, as the C component becomes smaller, the C/N ratio worsens, and it indicates a tendency shown in FIG. 5. When the C/N ratio is degraded, an error rate increases in reproducing the optical disc. In order to reproduce the optical disc at a state where the error rate is sufficiently low, in general, it is necessary to secure a C/N ratio of more than 48 dB. In a case of the quadruple density CD having a characteristic shown by black circles in FIG. 5, the C/N ration of 63 dB is obtained for 11T, and therefore, in order to obtain the C/N ratio more than 48 dB in nil the reproduced signals of 3T–11T, it is necessary for 3T to secure a reproduced amplitude more than 18% with respect to a reproduced amplitude of 11T. As seen from FIG. 6, in order to obtain a relative amplitude more than 18%, if the laser beam having a wavelength of 635 nm and the objective lens having a numerical aperture more than 0.50, the 3T signal must be formed by a pit having a pit length more than approximately 0.42 μm (exactly 0.416 μm). In addition, in FIG. 6, the above described amplitude becomes 18.18% in a case where a pit having a pit length of 0.416 μm is reproduced by utilizing the objective lens having a numerical aperture of 0.5. On the other hand, an upper limit of the shortest pit length is dependent on a recording density. In a case of the quadruple density CD, the upper limit is 0.49 μm. Therefore, it will be understood that the shortest pit length of the optical disc according to the present invention is to be within a range of 0.42 μm (exactly 0.416 μm)-0.49 μm.

Furthermore, in FIG. 7, an amplitude ratio of 3T/11T in the EFM modulation with variously changing the reproducing linear velocity is shown. As shown in FIG. 7, if the numerical aperture is equal to or larger than 0.5 and the linear velocity is larger than 0.6 m/s, it is possible to secure that the ratio of 3T with respect to 11T is equal to or larger than 18%.

In FIG. 8, an amplitude ratio of the tracking signals with variously changing the track pitch is shown. The pit width is 0.20-0.35 μm, and the wavelength of the laser is approximately 635 nm. In a case where the numerical aperture of the objective lens is 0.6, at a track pitch of 0.7 μm, a ratio of the tracking signal with respect to the tracking signal of the track pitch of 1.6 μm becomes approximately 40%. Furthermore, in a case where the numerical aperture of the objective lens is 0.5, at a track pitch of 0.85 μm (tolerance±0.05 μm), the ratio becomes approximately 40%. The value that is 40% is a limit that the tracking servo can be performed stably by the servo circuit 56 shown in FIG. 4. Therefore, in order to make the recording density of the optical disc quadruple, it is necessary to secure a track pitch of more than 0.7 μm. On the other hand, an upper limit of the track pitch is dependent on the recording density, and in a case of the quadruple density CD, the upper limit of the track pitch becomes 0.85 μm. However, as apparently understood from the above description, if the shortest pit length of the quadruple density CD shown in FIG. 2 is changed from 0.49 μm to 0.416 μm, it is possible to secure the same recording density as that of the quadruple density CD shown in FIG. 2 even if the track pitch is changed from 0.85 μm to 1.00 μm, and therefore, an upper limit of the track pitch may be 1.00 μm.

Furthermore, in a present disc producing process, an error at a degree of ±0.1 μm occurs due to a pitch variation in cutting an original disc and a distortion in pressing a copy disc, and therefore, if the limit of the track pitch is to be made 0.7 μm, it is preferable that the track pitch is made at a degree of 0.8 μm. In addition, in a case where the error can be made smaller according to the improvement of the disc producing process, it is, of course, possible to be made close to 0.7 μm.

Figure 9:
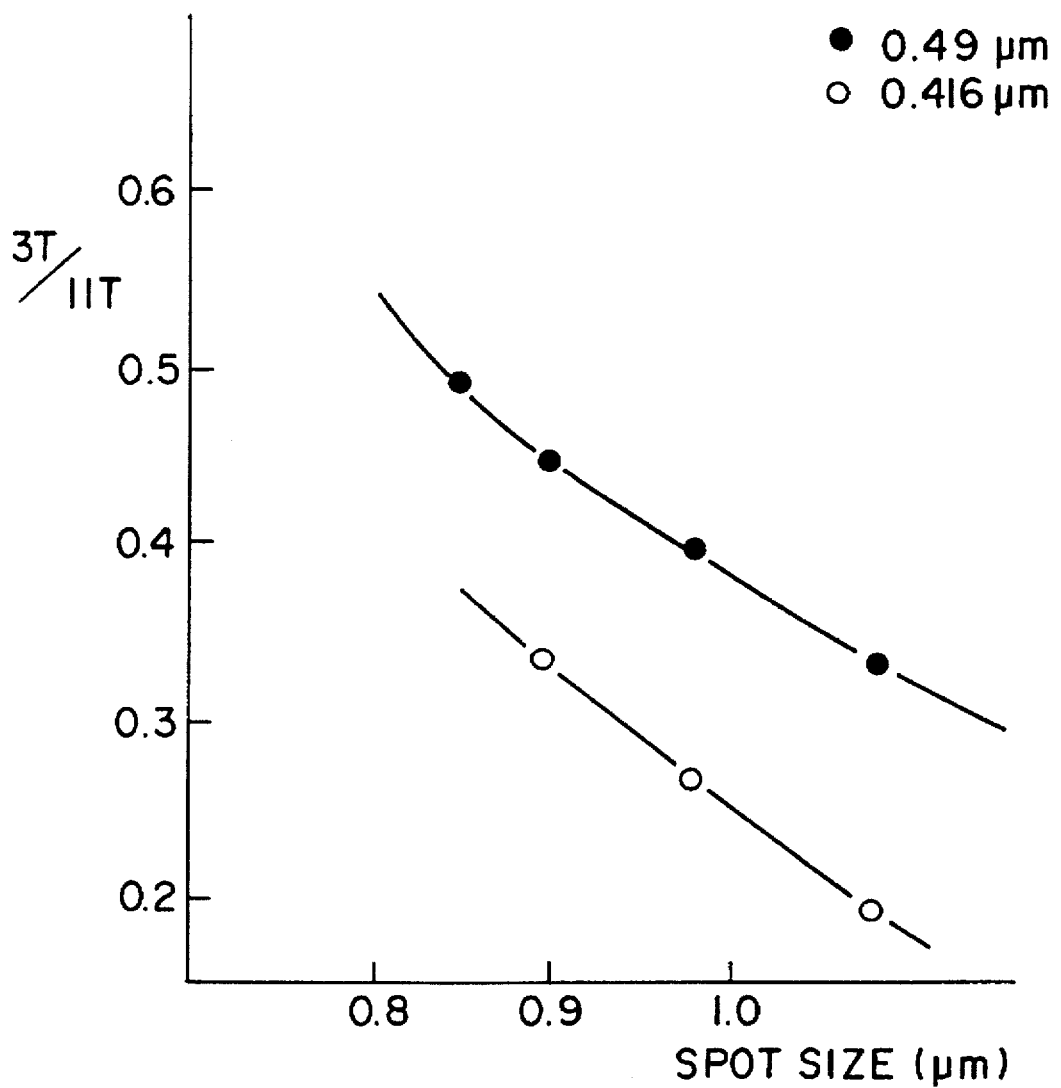
FIG. 9 is a graph showing an amplitude ratio of the reproduced signals of the 3T pit length and the 11T pit length with respect to a spot size.

FIG. 9 is a graph showing an amplitude ratio (3T/11T) of the reproduced signal with respect to a spot size of the laser beam irradiated onto the CD with a parameter of the shortest pit length of 0.49 μm or 0.416 μm. In a case where the laser beam having a wavelength of 635 nm is converged by the objective lens having a numerical aperture of 0.6, it is difficult to obtain a spot size less than 0.85 μm. Therefore, in this case, it will be understood that a spot size of the disc player according to the present invention is to be within a range of 0.90±0.05 μm, that is, 0.85-0.95 μm. In addition, in a case where the objective lens having a numerical aperture of 0.50 is utilized, it is difficult to obtain a spot size less than 1.02 μm, and 0.18 (18%) is required as the amplitude ratio of 3T/11T as described above, and therefore, it will be understood from FIG. 9 that in this case, a spot size of 1.02–1.18 μm is suitable for the optical disc player.

Figure 10:
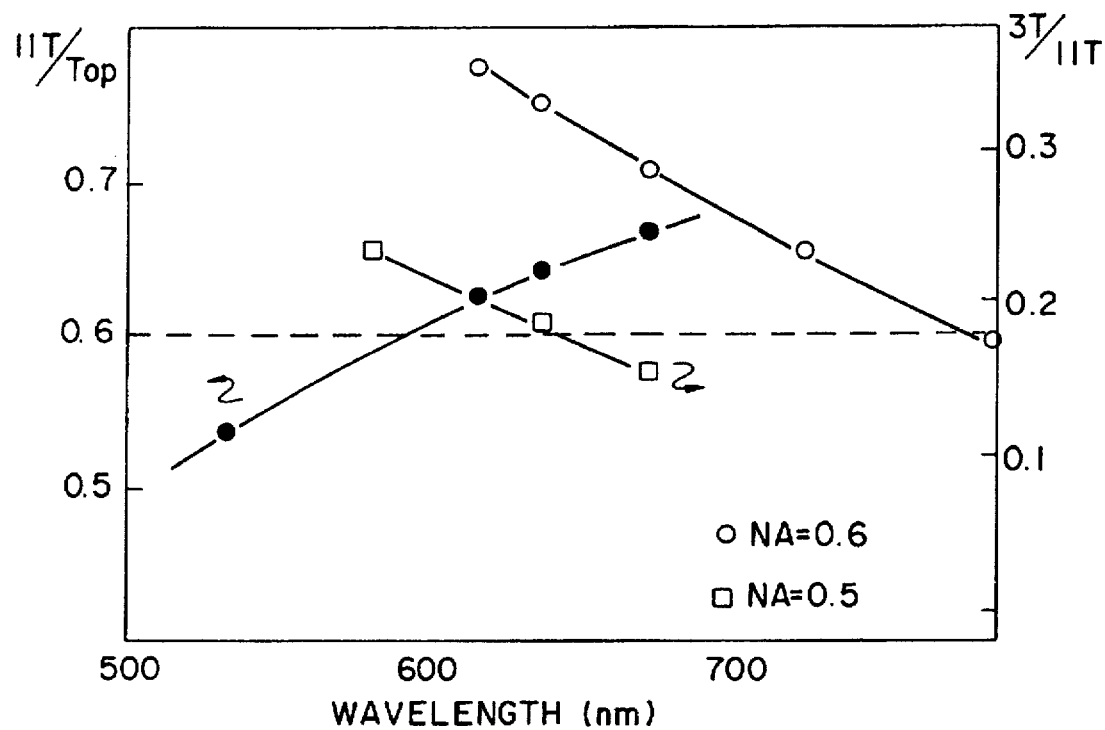
FIG. 10 is a graph showing a relationship between a wavelength and an amplitude ratio of the reproduced signals of the quadruple density CD according to the preferred exemplary embodiment, and a relationship between a wavelength and an amplitude ratio of reproduced signals of the conventional standard format CD.

In FIG. 10, black circles denote an amplitude ratio (11T/Top) with respect to the wavelength of the laser beam in the conventional standard format CD is shown. In addition, "Top" means a difference between an amplitude of a case no reflection light from the CD is returned to the optical pick-up and a maximum light amount at a time that 11T is reproduced. In addition, the amplitude ratio (3T/11T) of the reproduced signals when the objective lens having the numerical aperture of 0.6 is utilized is indicated by white circles, and the amplitude ratio (3T/11T) of the reproduced signals when the objective lens having the numerical aperture of 0.5 is utilized is indicated by white squares. On the other hand, if the wavelength is made too short, the difference between the wavelength and the optimum wavelength for the conventional standard format CD becomes larger. Therefore, in order to secure 11/Top of 0.6 (the present standard) or more in the conventional standard format, as seen from FIG. 10, it is required that the wavelength is more than 590 nm. In addition, the spot size of the laser beam converged by the objective lens having the numerical aperture of 0.6 becomes larger according to the increase of the wavelength of the laser, so that the amplitude ratio decreases. Therefore, in order to secure the reproduced amplitude more that 0.18 as described in the above, it is necessary to make the wavelength less than 770 nm. Accordingly, as seen from FIG. 10, if the numerical aperture is 0.6, the wavelength of 590–770 nm is required, and if the numerical aperture is 0.5, the wavelength of 590–635 nm (tolerance±15 nm) is required.

Therefore, in a case where the optical disc is reproduced by utilizing the objective lens having the numerical aperture of 0.6, the wavelength of the laser beam of the optical pick-up is needed to be set as 590–650 nm (including a tolerance), the track pitch of the optical disc is needed to be set as 0.8–1.00 μm including a tolerance), the shortest pit length is needed to be set as 0.42–0.49 μm, and the pit width is needed to be set as 0.2–0.35 μm.

Although the present invention has been described and illustrate in detail, it is clearly understood that the same is by way of illustration and example only and is not to be taken by way of limitation, the spirit and scope of the present invention being limited only by the terms of the appended claims.

What is claimed is:

1. An optical disc player for reproducing an information signal from one of an optical disc format and an optical disc having a track pitch of 0.7–0.85 μm, a pit width of 0.20–0.35 μm, and a shortest pit length of 0.42–0.49 μm, comprising:

a semiconductor laser having a wavelength of 590–770 nm;

irradiating means for irradiating a beam from said semiconductor laser onto said optical disc with a spot size of 0.85–0.95 μm;

detecting means for detecting reflected light from said optical disc; and photo-electric conversion means for converting said detected reflected light into an electric signal and outputting said electrical signal as said information signal.

2. A disc player according to claim 1, wherein said irradiating means includes means for irradiating said beam with a spot size of 0.90 μm.

3. A disc player according to claim 1, said irradiating means includes a beam condensing means for condensing said beam.

4. A disc player according to claim 2, wherein said beam condensing means includes an objective lens having a numerical aperture of approximately 0.6.

5. A disc player according to claim 1, wherein said irradiating means includes beam condensing means for converging said beam to produce high resolution.

6. A disc player according to claim 1, further comprising motor means for rotating said optical disc at a linear velocity of 2.4–2.8 m/s.

7. An optical disc player for reproducing an information signal from one of optical disc format and an optical disc having a track pitch of 0.8–1.00 µm, a pit width of 0.20–0.35 µm, and a shortest pit length of 0.42–0.49 µm, comprising:

a semiconductor laser having a wavelength of 590–770 nm;

an objective lens having a numerical aperture of 0.5–0.6 for irradiating a beam from said semiconductor laser onto said optical disc; and detecting means for detecting reflected light from said optical disc and photo-electric conversion means for converting said detected reflected light into an electrical signal and outputting said electrical signal as said information signal.

8. A disc player according to claim 7, wherein said track pitch is 0.85 µm.

9. A disc player according to claim 7, wherein said wavelength of said semiconductor laser is approximately 635 nm.

10. An optical disc player according to claim 1, wherein said wavelength is 590–650 nm.

11. An optical disc player according to claim 10, wherein said wavelength is 635±15 nm.

12. An optical disc player for reproducing an information signal from one of an optical disc format and an optical disc having a track pitch of 0.7–0.85 µm, and a shortest pit length of 0.42–0.49 µm, comprising:

a semiconductor laser having a wavelength of 590–770 nm;

an objective lens having a numerical aperture of 0.5–0.6 for irradiating a beam from said semiconductor laser onto said optical disc;

detecting means for detecting reflected light from said optical disc and photo-electric conversion means for converting said detected reflected light into an electrical signal and outputting said electrical signal as said information signal.

13. An optical disc player according to claim 12, wherein said wavelength is 590–650 nm.

14. An optical disc player according to claim 13, wherein said wavelength is 635±15 nm.

15. An optical disc player for reproducing an information signal from one of an optical disc format and an optical disc having a track pitch of 0.8–1.00 µm, and a shortest pit length of 0.42–0.49 µm, comprising:

a semiconductor laser having a wavelength of 590–770 nm;

an objective lens having a numerical aperture of 0.5–0.6 for irradiating a beam from said semiconductor laser onto said optical disc; and detecting means for detecting reflected light from said optical disc and photo-electric conversion means for converting said detected reflected light into an electrical signal and outputting said electrical signal as said information signal.

* * * * *